United States Patent
Schorr et al.

(10) Patent No.: US 10,054,441 B2
(45) Date of Patent: Aug. 21, 2018

(54) BUILDING SURVEYING DEVICE WITH AN AUTOMATIC PLUMB POINT FINDING FUNCTIONALITY

(75) Inventors: Christian Schorr, St. Gallen (CH); Frank Schroeder, Heerbrugg (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 1203 days.

(21) Appl. No.: 13/302,926

(22) Filed: Nov. 22, 2011

(65) Prior Publication Data

US 2012/0130675 A1 May 24, 2012

(30) Foreign Application Priority Data

Nov. 24, 2010 (EP) .................................. 10192443

(51) Int. Cl.
   *G01C 15/10* (2006.01)
(52) U.S. Cl.
   CPC .................................. *G01C 15/105* (2013.01)
(58) Field of Classification Search
   CPC .... G01C 15/105; G01C 15/008; G01C 15/02; G01C 15/10; G01C 5/00; G01C 15/00; G01C 9/00; G06F 15/00
   USPC ..................................... 702/154; 33/228, 286
   See application file for complete search history.

(56) References Cited

U.S. PATENT DOCUMENTS

| | | | |
|---|---|---|---|
| 5,182,863 A * | 2/1993 | Rando ........................ | G01B 3/00 33/227 |
| 2007/0180716 A1* | 8/2007 | Hertzman ........................ | 33/290 |
| 2009/0220054 A1* | 9/2009 | Baumann ........................ | 378/205 |
| 2010/0123892 A1* | 5/2010 | Miller et al. ................. | 356/4.01 |
| 2011/0113888 A1* | 5/2011 | Busch .................. | G01B 11/272 73/655 |
| 2014/0198207 A1 | 7/2014 | Lippuner et al. | |

FOREIGN PATENT DOCUMENTS

| CN | 2779348 Y | 5/2006 |
|---|---|---|
| CN | 201209364 Y | 3/2009 |
| CN | 201293641 Y | 8/2009 |
| DE | 44 43 413 A1 | 6/1996 |
| DE | 195 43 299 A1 | 5/1997 |

(Continued)

OTHER PUBLICATIONS

European Search Report dated May 16, 2011 as received in related application No. 10 19 2443.9.

*Primary Examiner* — Yoshihisa Ishizuka
(74) *Attorney, Agent, or Firm* — Maschoff Brennan (57) ABSTRACT

A building surveying device comprising a base, an upper part supported on the base such that it can rotate about a rotation axis, a sighting unit with a laser source designed for emitting a laser beam, and a laser light detector and an evaluation and control unit. The building surveying device has a plumb point finding functionality which, after being triggered, runs automatically, at least in part, and in the course of which the alignment of the sighting unit is changed under automatic control by the evaluation and control unit with the aid of the first and/or the second rotary drive and as a function of a known, defined first spatial point in such a way that precisely one such second spatial point lying on an object surface is approached and marked by the laser beam, which lies on a vertical plumb line containing the first spatial point.

19 Claims, 6 Drawing Sheets

(56) References Cited

FOREIGN PATENT DOCUMENTS

| | | | |
|---|---|---|---|
| DE | 195 45 589 A1 | 6/1997 | |
| DE | 196 48 626 A1 | 5/1998 | |
| EP | 1 944 572 A1 | 7/2008 | |
| EP | 2 423 640 A1 | 2/2012 | |
| FR | 2 630 539 A1 | 10/1989 | |
| JP | 2818610 B2 | 10/1998 | |
| JP | 2006-023237 A | | 1/2006 |
| JP | 2006023237 A | * | 1/2006 |
| WO | 96/18083 A1 | 6/1996 | |

* cited by examiner

BUILDING SURVEYING DEVICE WITH AN AUTOMATIC PLUMB POINT FINDING FUNCTIONALITY

CROSS REFERENCE TO RELATED APPLICATIONS

This application claims priority to European Patent Application No. 10192443.9 filed on Nov. 24, 2010, the contents of which are incorporated herein in its entirety.

FIELD OF THE INVENTION

The invention relates to a building surveying device for measuring and marking spatial points in the course of construction and/or development—in particular interior finishing—of buildings, and an associated method for plumb point finding with such a building surveying device, and to a computer program product for providing, controlling and carrying out the method according to the invention.

BACKGROUND

A large number of technical arrangements and methods are known for measuring and marking spatial points in the course of construction or development of buildings. In order to fulfill complex surveying tasks, in particular in a free terrain, geodetic total stations or theodolites, as known in the generic prior art, have been used for very many years. Such devices are, in principle, technically also suitable for fulfilling a plumb point finding functionality, for example during interior finishing of a building. However, they are technically relatively complex and costly devices, the operation of which is generally also too complex and complicated for a user not specifically trained in surveying technology, such as, for example, an artisan working in interior finishing of buildings.

For these reasons, an apparatus and a method for measuring uneven or planar surfaces of an open or closed space, for example of a room in a building, wherein a distance measuring device coupled to a theodolite is used, as proposed in FR 2 630 539, appear not to be very suitable for interior surveying of spaces that can be carried out in a simple manner.

In order to determine a plumb point and associated measuring and marking points in a building space, a conventional plumb bob is still used in many cases. In this context, the upper point of the plumb bob has to be able to be reached physically by a user, which can be difficult or even virtually impossible in high spaces (for example in high halls or church spaces).

In order to support conventional plumb point determination by means of a plumb bob or as an alternative to the use of a plumb bob, it is likewise known to use surveying devices based on emission of laser beams and reception of the reflection thereof from a spatial point provided as a plumb point. By way of example, such devices are designed and embodied in such a way that—after bringing the laser light source to a desired predetermined position—a perpendicular laser beam is emitted substantially in a self-centered fashion and, consequently, the spatial point situated perpendicularly directly above or below the predetermined position is indicated and/or marked by a laser beam.

DE 196 48 626 discloses a method and an apparatus for surface measurement with a laser distance measuring device comprising a laser transmitter and a laser receiver. The laser distance measuring device is mounted on a stand. The apparatus furthermore comprises a tilting and rotating device for alignment and distance measurement, a telescopic sight and also an electronic evaluation unit for angle data and distance data acquisition and data transfer to a computer. For measuring a space, the device is positioned at a central location in the space, from which all spatial and/or surface corner points to be acquired can be sighted by and exposed to the laser beam. In accordance with the disclosure in DE 196 48 626, the spatial points to be measured are in this case each sighted individually, if appropriate in the case of a relatively large distance with support of the observation by means of a telescopic sight. An automated sequential measurement of a plurality of spatial points, to be compared with a scan, for example, is not disclosed in DE 196 48 626. In particular, this document gives no indications whatsoever for possibilities concerning plumb point finding.

A similar apparatus and associated surveying method are disclosed in DE 195 43 299. This published patent application also reveals no indications with regard to an automated sequential measurement of a plurality of spatial points, comparatively with a scan, for example, and in particular no description concerning possibilities for plumb point finding.

A further similar apparatus and associated surveying method are disclosed in DE 44 43 413, the complementary published patent application DE 195 45 589 and WO 96/18083, which claims the priority of DE 44 43 413. They describe a method and an apparatus for measuring and marking on distantly situated lines, surfaces or in at least partly closed spaces. One or a plurality of relevant spatial points are measured according to in each case two solid angles and the distance relative to a reference location by means of a cardanically mounted laser distance measuring device. The laser distance measuring device can be pivoted about two mutually perpendicular axes equipped with goniometers. In accordance with one embodiment described in these documents, spatial points to be measured are selected manually and marking points are calculated from the measurement data, on the basis of a predetermined relative reference between measurement and marking, said marking points then being approached independently by the measuring and marking apparatus.

An embodiment for carrying out absolute measurements and markings is also disclosed, for which purpose a system leveling is carried out, which relates the mathematical model for calculating the spatial point coordinates in relationship to the actual directions in the space, whereby in principal it should also be possible to drop plumb lines in the space.

However, there is no disclosure of an automatically proceeding plumb point finding functionality on the basis of only one defined, first spatial point, and equally little disclosure of an automated sequential measurement of a plurality of spatial points, to be compared with a scan, for example.

Plumb point finding using relatively simple surveying devices based on laser measurement ensures a relatively large working or distance range with respect to a plumb point that is provided or to be remeasured, in association with relatively high accuracy. However, in accordance with the apparatuses known from the prior art, it is necessary to arrange the emission point of the laser precisely directly above or below the predetermined position for the spatial point provided as a plumb point, with exactly perpendicular alignment of the laser beam.

In the case of a relatively large distance between the laser and the sighted spatial point, the visual recognition thereof can be difficult. A further significant problem exists when the direct optical or visual link between the emission point and reception point of the reflected radiation is blocked, for example by objects situated in between with respect to the target point in the target direction. For plumb point measurement in such a situation, essentially, in accordance with the known teaching, only the use of complex surveying systems such as total stations or theodolites is appropriate, but this hardly seems advisable owing to the abovementioned technical complexity or economic outlay, or a very complex surveying method based on surveying systems mentioned above, for example with the measurement of additional spatial support points and the spatial correlation thereof by the operator, is appropriate, but this presupposes profound geometrical knowledge on the part of the user, which a user who is not relevantly trained generally does not possess and which would furthermore make the surveying process very complicated, in particular time-consuming.

SUMMARY

The object of the invention is to provide an improved building surveying device, in particular for plumb point determination for interior finishing of buildings, with which existing disadvantages in accordance with the prior art can be overcome. The object in this case is particularly to provide a simple surveying system and an associated surveying method, aided by an associated computer program, whereby simple plumb point determination and marking is made possible even for an operator not specifically trained in surveying technology.

This object is achieved by the realization of the characterizing features of the independent claims. Features that develop the invention in an alternative or advantageous manner can be gathered from the dependent patent claims and also the description including the descriptions of figures. All embodiments of the invention that are illustrated or disclosed in some other way in this document can be combined with one another, unless expressly stated otherwise.

The invention relates to a building surveying device for measuring and marking spatial points in the course of construction and/or development—in particular interior finishing—of buildings. The system comprises a base and an upper part supported on the base such that it can rotate about a rotation axis. A sighting unit supported such that it can pivot about a pivoting axis and equipped with a laser source designed for emitting a laser beam and a laser light detector is arranged on the upper part, said sighting unit providing a distance measuring functionality. The building surveying device according to the invention furthermore comprises an evaluation and control unit.

In this case, the system comprises a first and second rotary drive enabling the upper part and the sighting unit to be driven and aligned. A spatial alignment of the sighting unit in relation to the base can be acquired via two goniometers. In particular, in this case—given leveled installation of the device or of the base of the device—the goniometers are designed for determining an azimuth angle and an elevation angle with respect to the sighted spatial point. The evaluation and control unit is connected to the laser source, the laser light detector and the goniometers in order to assign an acquired distance to a corresponding alignment and thus to determine coordinates for spatial points.

According to the invention, the building surveying device has a plumb point finding functionality which, after being triggered, runs automatically, at least in part. With the aid of the plumb point finding functionality, the alignment of the sighting unit is changed under automatic control by the evaluation and control unit with the aid of the first and/or the second rotary drive and as a function of a known, defined first spatial point in such a way that precisely one such second spatial point lying on an object surface is approached and marked by the laser beam, which lies on a vertical plumb line containing the first spatial point. In this case, in particular, spatial points situated in a defined tolerance region around the vertical plumb line are also deemed to be lying on the vertical plumb line.

In this case, what is used as a perpendicular direction is a direction which is assumed to be vertical or is defined as vertical and which is determined before or during the progression of the functionality according to the invention relative to the outer surroundings. This is usually the direction of the Earth's gravitational field vector which is used as a perpendicular direction. The current alignment of the device relative to the Earth's gravitational field vector can preferably be determined by inclination sensor means—which, in particular, are integrated into the base of the device—, the measurement data of which are likewise communicated to the evaluation and control unit. The determination of spatial coordinates of the respective plumb point can then be based thereon. As is known to the person skilled in the art, the inclination sensor means can in this case be designed to determine the inclination relative to the gravitational field (or relative to a horizontal plane aligned perpendicularly with respect to the gravitational field) in two directions (i.e. about two axes). By way of example, two one-axis inclination sensors or one two-axis inclination sensor can be appropriate for this (such as optoelectronic spirit level sensors, an optoelectronic oil pot or an optoelectronic box level). One example of such an oil-pot-like inclination sensor which can be used to determine the inclination at least about two axes is described in detail in the European Patent Application having the application number EP 10173726.0.

Alternatively, the determination—which is then to be effected beforehand, in particular—of the vertical direction, that is to say of the perpendicular direction assumed to be vertical, can also be effected by measuring end points of a plumb rod or plumb bob suspended in a freely oscillating fashion.

A direction can be determined as and assumed to be the perpendicular direction even when no reference to the alignment of the gravitational field vector is established for said direction itself, for example the perpendicular to a room ceiling assumed to extend horizontally. In order to determine the perpendicular direction beforehand, therefore, it is also possible e.g. to effect a measurement of at least three spatial points in a plane assumed to be horizontal (ceiling, floor), on which the determination of spatial coordinates of the plumb point is then in turn based. In this case, therefore, a plane assumed to be aligned horizontally (such as a room ceiling) can then be used as an outer reference for the perpendicular direction, even if the latter actually deviates slightly from the vertical actually defined by the Earth's gravitational field (e.g. as a result of inaccuracies in the construction of the room ceiling, etc.).

Preferably, in the course of the plumb point finding functionality, the alignment of the sighting unit is changed automatically following a search scheme and in this case spatial points are measured until the second spatial point is reached with the laser beam.

It is furthermore preferred for the alignment of the sighting unit to be changed automatically iteratively in a manner approaching the second spatial point and in this case spatial points to be measured continuously until the second spatial point is reached with the laser beam.

According to the invention, typically in the course of the plumb point finding functionality, the following steps are automatically carried out repeatedly until the second spatial point is reached with the laser beam:

measuring a currently sighted spatial point, determining a mathematical passage point of the vertical plumb line through a horizontal plane containing the currently sighted spatial point, and aligning the sighting unit in the direction of the passage point determined.

By way of example—with the alignment of the sighting unit with the azimuth angle of the first spatial point—in the course of the plumb point finding functionality the elevative alignment of the sighting unit is varied and in this case spatial points are continuously measured until the second spatial point is reached with the laser beam.

If the sighting unit is situated with an azimuthal alignment deviating from the azimuth angle of the first spatial point, in the course of the plumb point finding functionality the sighting unit is firstly aligned automatically with the azimuth angle of the first spatial point.

In accordance with another possible embodiment of the building surveying device according to the invention—with the alignment of the laser beam with the object surface—in the course of the plumb point finding functionality at least three spatial points lying on the object surface are automatically measured or predetermined, and a plane spanned by these three spatial points is defined. The point of intersection of said plane with the vertical plumb line is calculated, and then precisely said point of intersection is approached and marked by the laser beam as the second spatial point.

Advantageously, moreover, in the course of the plumb point finding functionality the second spatial point is automatically measured after the latter has been reached, and a distance is derived as a difference in height between the first and the second spatial point by the evaluation and control unit and is provided to the user.

In particular, the sighting unit is designed in such a way that the laser beam that can be emitted by the laser source serves as measurement and marking laser beam, and, with the aid of portions of the laser beam which are reflected at the object surface and are received by the laser light detector, the distance from that spatial point of the object surface which is sighted by means of the laser beam can be determined by the evaluation and control unit.

Alternatively, however, the laser beam can also have a plurality of portions—e.g. also emitted by different sources—, in particular a portion for use as a marking laser beam and a portion for use as a measurement laser beam, which is emitted parallel or coaxially with respect to the marking laser beam. In this case, the portions can have for example a different wavelength, for example a wavelength in the range of visible light for the marking laser beam and a wavelength in the range of IR or NIR light for the measurement laser beam. For this purpose, the sighting unit can also be designed in such a way that the laser source has two partial laser sources, which are designed separately for emitting a first portion of the laser beam as marking laser beam in the visible wavelength range and respectively a second portion—running coaxially or slightly parallel in an offset fashion with respect to the marking laser beam—of the laser beam as measurement laser beam in the near infrared wavelength range.

In particular, a digital camera is integrated into the sighting unit and its optical axis is aligned substantially coaxially with respect to the aiming axis of the sighting unit (i.e. the camera is aligned in that direction in which the measurement and marking laser beam is also emitted). The camera image, into which a crosshair can be inserted at that location in the image which corresponds to the aiming axis, serves in particular for sighting the desired target points in the space and can be displayed e.g. on the display of a remote control unit that can be handheld for the building surveying device (in particular as a live video stream).

In accordance with one development of the invention—in order to support the automatic plumb point finding process—camera images that are evaluated with the aid of image processing can also be used for determining the plumb point sought. By way of example, with the aid of edge extraction in a recorded camera image, the boundaries of wall surfaces can be derived and assumptions about the imaged surfaces can be made, e.g. whether a room side wall, the room ceiling, the room floor or a surface of a roof slope is probably involved. With the aid of these assumptions, the plumb point finding process can be supported and optimized. By way of example, if the starting point to be plumbed (i.e. the known, first spatial point) is a point that presumably lies on the room floor, the finding process for the perpendicularly opposite spatial point sought (as second spatial point) can be started identically at the presumable room ceiling, for which purpose, as the start position for the plumb point finding process, the sighting unit can be aligned with a spatial point that lies on that surface within the edge image which is assumed to be the room ceiling.

The invention also relates to a plumb point finding method with a building surveying device according to the invention in accordance with one of the embodiments mentioned above, wherein, in the course of the plumb point finding method, the alignment of the sighting unit is changed under automatic control by the evaluation and control unit with the aid of the first and/or the second rotary drive and as a function of a known, defined first spatial point in such a way that precisely one such second spatial point lying on an object surface is approached and marked by the laser beam, which lies on a vertical plumb line containing the first spatial point.

In this case, in particular, spatial points which are also situated in a defined tolerance region around the vertical plumb line are intended to be deemed to be lying on the vertical plumb line.

Further embodiments of the plumb point finding method according to the invention are described in the dependent claims and have already been described analogously above as developments of the plumb point finding projection functionality according to the invention of the building surveying device.

The invention further relates to a computer program product comprising program code, which is stored on a machine-readable carrier, for providing, controlling and carrying out the method according to the invention and the plumb point finding functionality of the building surveying device according to the invention in accordance with one of the embodiments mentioned above. Preferably, the program is executed on an electronic data processing unit embodied as an evaluation and control unit of the building surveying device according to the invention.

BRIEF DESCRIPTION OF THE DRAWINGS

The building surveying device according to the invention and the plumb point finding method according to the invention are described in greater detail below purely by way of example on the basis of specific exemplary embodiments illustrated schematically in the drawings, further advantages of the invention also being discussed. In detail, FIG. 3 shows a situation in which plumb point finding is made more difficult by the fact that the direct optical contact between a first spatial point 1a and a second spatial point 1b is blocked.

DETAILED DESCRIPTION

Figure 1A:
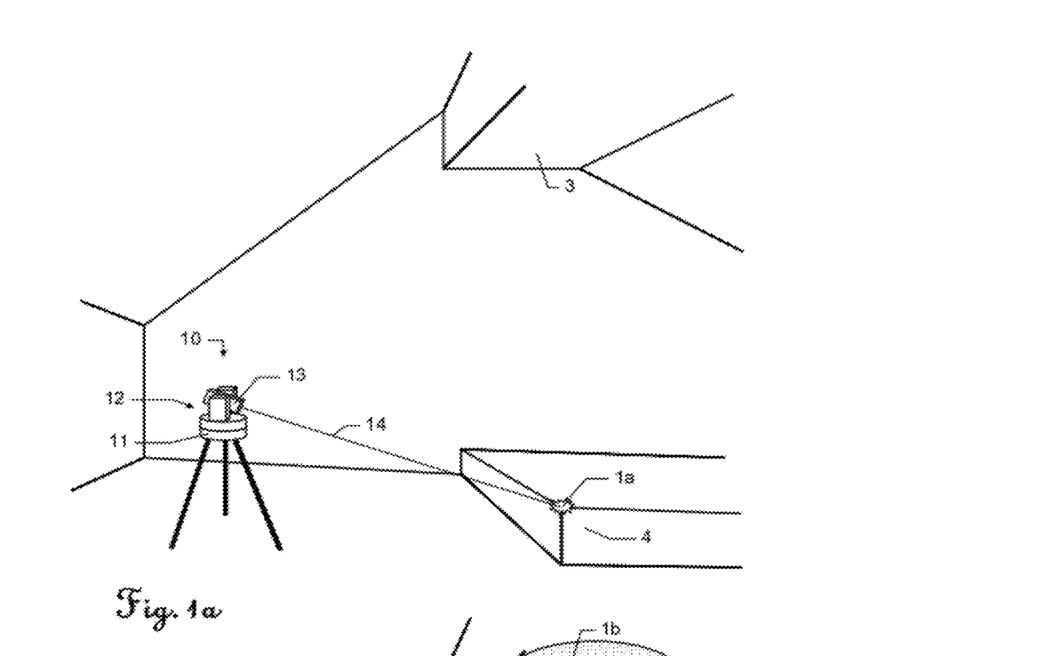
FIGS. 1a and 1b show a building surveying device according to the invention and illustrates a method that can be implemented therewith for surveying a building.
Figure 1B:
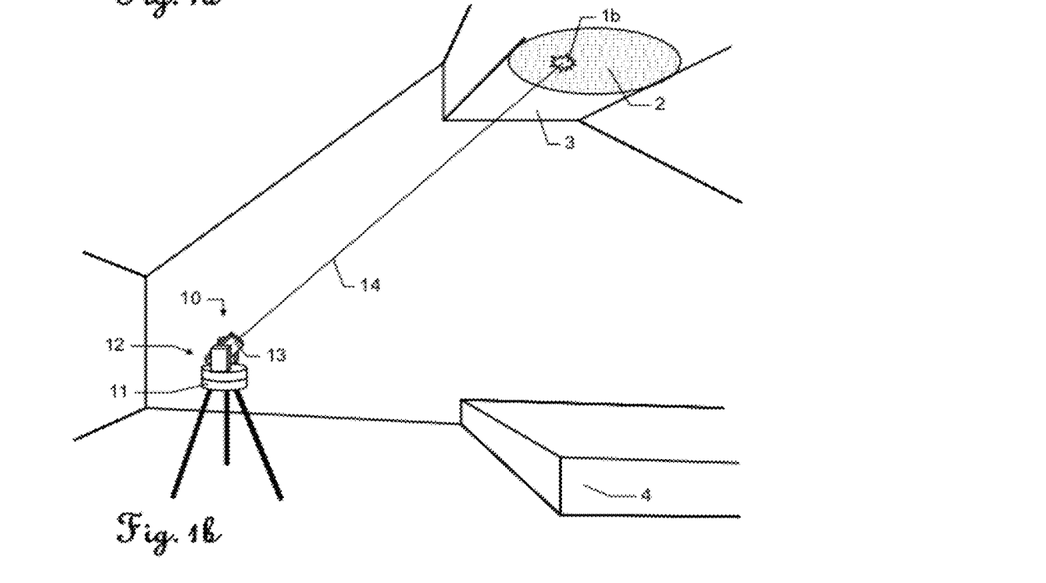

FIGS. 1a and 1b illustrate a building surveying device 10 according to the invention and a method that can be implemented therewith for surveying a building, more specifically for determining and marking the vertical plumb line from a defined first spatial point 1a at an upper corner of a plinth 4 to a second spatial point 1b lying on an object surface 3. The reference numeral 2 indicates, in accordance with one possible embodiment of the invention, a defined tolerance region within which spatial points situated are deemed to lie on the vertical plumb line.

The building surveying device 10 comprises a base 11, embodied as a tripod stand in this example, with an upper part 12 supported thereon such that it can rotate. A sighting unit 13 supported on the upper part 12 such that it can pivot is equipped with a laser source designed for emitting a laser beam 14, and with a laser light detector, and thus provides a distance measuring functionality.

The building surveying device 10 furthermore comprises an evaluation and control unit, which is not illustrated for the sake of simplification, wherein—likewise not illustrated for the sake of simplification—a first and a second rotary drive enable the upper part 12 and the sighting unit 13 to be driven and aligned. The spatial alignment of the sighting unit 13 in relation to the base 11 can be acquired via two goniometers. The evaluation and control unit is connected to the laser source, the laser light detector and the goniometers in order to assign an acquired distance to a corresponding alignment of the sighting unit 13 and thus to determine coordinates for spatial points.

In particular, provision is additionally made of one two-axis inclination sensor or two one-axis inclination sensors which can be used to determine an inclination of the base 11 in relation to a horizontal plane, relative to the Earth's gravitational field vector. Firstly, the outer reference of the perpendicular direction is defined thereby and, secondly, the current alignment of the base 11 (and thus also of the sighting unit 13 and of the entire device) in relation to this outer perpendicular direction is determined. In general, with such additional equipment with leveling or inclination sensors, a highly precisely horizontally aligned installation—which is otherwise to be manually effected in a laborious manner—of the base 11 with respect to the Earth's gravitational field vector is not necessary, but rather can be taken into account computationally by the evaluation and control unit (vertical axis error compensation).

According to the invention, the building surveying device 10 has a plumb point finding functionality which, after being triggered, runs automatically, at least in part, and in the course of which the alignment of the sighting unit 13 is changed under automatic control by the evaluation and control unit with the aid of the first and/or the second rotary drive and as a function of the known, defined first spatial point 1a in such a way that precisely the second spatial point 1b lying on the object surface 3 is approached and marked by the laser beam 14 (see FIG. 1b).

Advantageously, automatically after reaching the second spatial point with the laser beam, said second spatial point can immediately be measured and a distance can be derived as a difference in height between the first and the second spatial point by the evaluation and control unit and be provided to the user.

Figure 2:
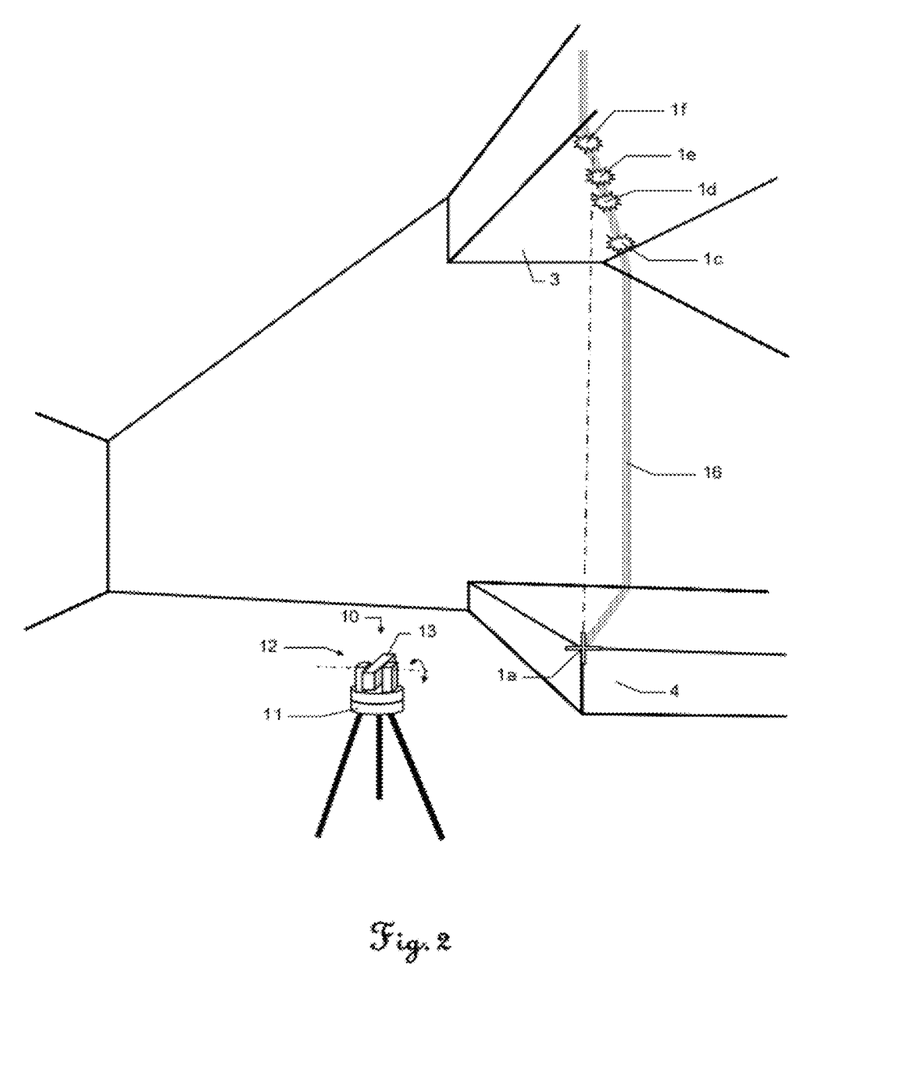
FIG. 2 shows one preferred embodiment of the invention.

FIG. 2 illustrates one embodiment of the invention, wherein, in the course of the plumb point finding functionality for determining and marking the vertical plumb line 15, proceeding from the first defined spatial point 1a, the alignment of the sighting unit 13 is changed automatically iteratively in a manner approaching the spatial point 1b (not illustrated in FIG. 2) to be marked and in this case, in a manner following a track 16 of the laser beam, spatial points 1c, 1d, 1e and 1f are measured continuously until the second spatial point 1b is reached with the laser beam 14.

FIG. 3 illustrates a situation in which plumb point finding from the first defined spatial point 1a to the object surface 3' would hardly be possible by means of conventional simple building surveying devices, without the use of a total station or a theodolite, since direct optical contact between the spatial point 1a and the second spatial point 1b is blocked by a table 5.

A comparable situation can also exist such that a plumb line from a spatial point on one storey of a building shell into a next storey—as it were "through the intermediate ceiling"—is intended to be determined, but (for example through an open stairwell or an open elevator shaft) an optical contact from the building surveying device according to the invention to the two spatial points (i.e. the starting point whose plumb point is sought and the plumb point then to be sought in the other storey) is ensured.

According to the invention, it is then possible, in a manner following the track 16 of the laser beam 14, to determine and mark the second spatial point 1b—if appropriate within a defined tolerance region 2.

Figure 4:
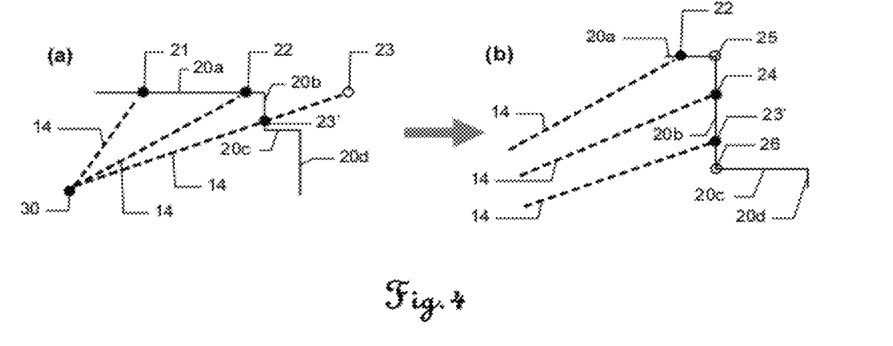
FIG. 4 shows a modification of a building surveying device according to the invention equipped with a specific functionality for the detection and precise three-dimensional measurement of edges and/or corners, in particular in a building space.

FIG. 4 illustrates a further aspect with regard to the building surveying device according to the invention, which is equipped with a specific functionality for the detection and precise three-dimensional measurement of edges and/or corners, in particular in a building space. The building surveying device in accordance with FIG. 4 can have this functionality in addition or as an alternative to a plumb point finding functionality as described above. The building surveying device in accordance with FIG. 4, which itself is not depicted and the location 30 of which is indicated schematically in the left-hand part of FIG. 4, having the specific functionality for the detection and precise measurement of edges and/or corners, is typically embodied in a manner corresponding to the previous FIGS. 1a, 1b, 2 and 3, for example comprising a base, embodied as a stand, with an upper part supported thereon such that it can rotate. A sighting unit supported on the upper part such that it can pivot is equipped with a laser source designed for emitting a laser beam, and with a laser light detector, and thus provides a distance measuring functionality. The building surveying device furthermore comprises an evaluation and control unit, and rotary drives which enable the upper part and the sighting unit to be driven and aligned. The spatial alignment of the sighting unit in relation to the base can be acquired via goniometers. The evaluation and control unit is connected to the laser source, the laser light detector and the goniometers in order to assign an acquired distance to a corresponding alignment of the sighting unit and thus to determine coordinates for spatial points.

In this case, FIG. 4 illustrates the situation for the measurement of an angled wall 20a, 20b, 20c, 20d from the standpoint 30 of the building surveying device.

In accordance with a conventional scan functionality of a building surveying device, firstly the scan starting position and the scan direction are defined, a fixed distance between spatial points that are to be measured successively is predetermined, and then the device for automatically measuring the polar coordinates of the spatial points arranged at a defined distance from one another along the predetermined profile is started.

In accordance with such a conventional scan functionality with fixed scan intervals, the sighting unit, with a laser beam, would sight firstly the spatial point 21, then the spatial point 22 and afterward the virtual spatial point 23 in a continuation direction of the wall part 20a of the angled wall. The corner point 25 would thus be omitted during the measurement.

With the aid of the specific functionality for the detection and precise three-dimensional measurement of edges and/or corners, the position of sequentially measured spatial points is automatically analyzed for irregularities such as correspond, for example, to changes in the direction of wall parts 20a, 20b, 20c, 20d to be measured relative to the sighting unit. In the event of such an irregularity being ascertained, an algorithm is automatically started for the combined precalculation/predetermination and measurement of intermediate points between or in the vicinity of measured spatial points for which irregularities of the type described were ascertained (see FIG. 4a). With the aid of this functionality, which does not require image recording and image processing, an operator is enabled to automatically measure the profile of a wall 20a, 20b, 20c, 20d with the spatial points 21, 22, 23', 24 and the corner points 25 and 26. Optionally, it is possible to enable this additional functionality to be switched off, such that an operator can ignore an irregularity ascertained and the scan is continued to the next scan point, in accordance with the conventional scan functionality.

In accordance with the prior art, these above-described functionalities proceeding automatically in preprogrammed fashion could only be fulfilled manually and, for example, with total stations or scanners with complex equipment with complicated software, wherein e.g. total stations indicate an error message when a signal of a laser distance measurement is split. The functionalities for a building surveying device as described now allow even a user who is not specifically trained as a surveying expert to perform simple three-dimensional measurements with a device that is simple to operate and is of low complexity and is suitable particularly for use in the building trade, for example by architects, kitchen fitters, staircase constructors and masons in the interior finishing of buildings.

Figure 5A:
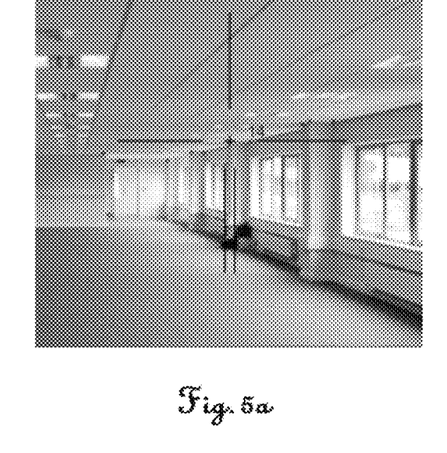
FIGS. 5a-5c show a functionality which is made possible with a further modification of a building surveying device, with or else without plumb point finding functionality and/or specific functionality for the detection and precise three-dimensional measurement of edges and/or corners.
Figure 5B:
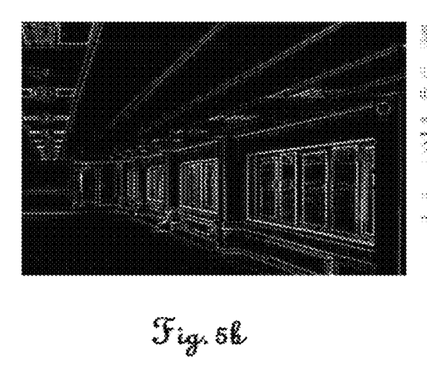
Figure 5C:
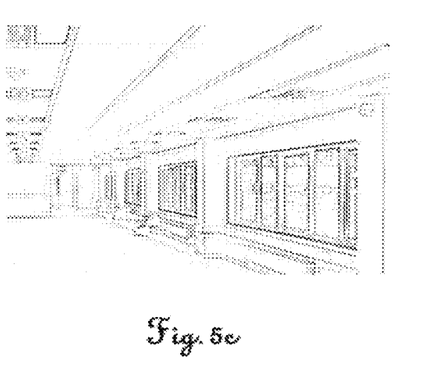

FIGS. 5a to 5c illustrate a functionality which is made possible with a further modification of a building surveying device, as described above, with or else without plumb point finding functionality and/or specific functionality for the detection and precise three-dimensional measurement of edges and/or corners, wherein, as a prerequisite, the building surveying device is equipped with a (digital) overview camera. Together with the image processing functionality described below for highlighting structural edges, a simple visualization and identification of details in an image, for example with low contrast or recorded in dark surroundings or with low illumination light intensity, is made possible even for a non-specialized operator.

FIG. 5a shows an image recorded by the overview camera, this image having only a weak contrast. A crosshair is inserted or overlaid into the image and is intended to indicate a spatial point to be measured as a target. On account of the weak contrast and/or inadequate illumination light conditions, details of the imaged space which are necessary for precise sighting by a sighting unit are indiscernible or discernible only with difficulty.

Upon activation of the specific image processing functionality according to the invention for highlighting structural edges, the image data from the overview camera, which is embodied as a color or black and white image camera, are converted into black and white data, with suppression of fluid intensity transitions in accordance with a continuous gray scale. Image objects having high or low brightness are represented in white or black, without intervening gray levels, wherein, in accordance with FIGS. 5b and 5c, it is possible to choose between complementary black and white or white and black representation for the representation of different image brightnesses. Optionally, in accordance with this image processing functionality, a threshold value for the brightness of the image objects of the original image to be converted into the contrast-enhancing black and white image starting from which conversion into black or white is effected can be adjustable. Contrast generation in accordance with the current processing requirements for different image objects is thus additionally made possible.

Moreover, such a representation produced with this image processing functionality can also readily be implemented for automatic generation of construction drawings.

This functionality enables details such as edges, for example, to be made readily identifiable for a measurement, which details are precisely identifiable only with difficulty using a regular telescope of a total station or from a real image of a camera under unfavorable recording conditions. In the case of measurement with the aid of a telescope, in the case of weak illumination light intensity, the limited diameter of the field of view of the telescope and restricted light amplification possibilities, in comparison with perception by the human eye, have a restrictive effect here. In particular, a specific target illumination or an eccentric measurement is unnecessary when this image processing functionality is used.

Figure 6A:
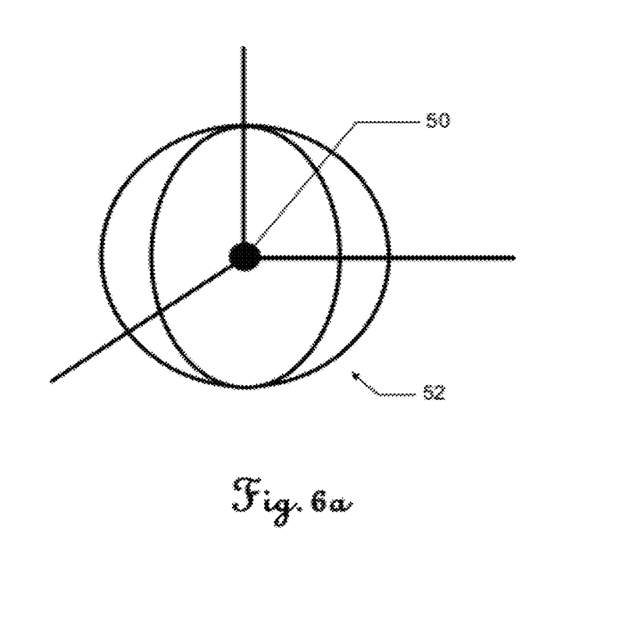
FIGS. 6a and 6b show a further functionality, more precisely a functionality for indicating a threshold value radius 51 around an already measured spatial point 50 for the potential measurement—to be decided by a user—and storage of the coordinates of further spatial points, which is made possible with a further modification of a building surveying device.
Figure 6B:
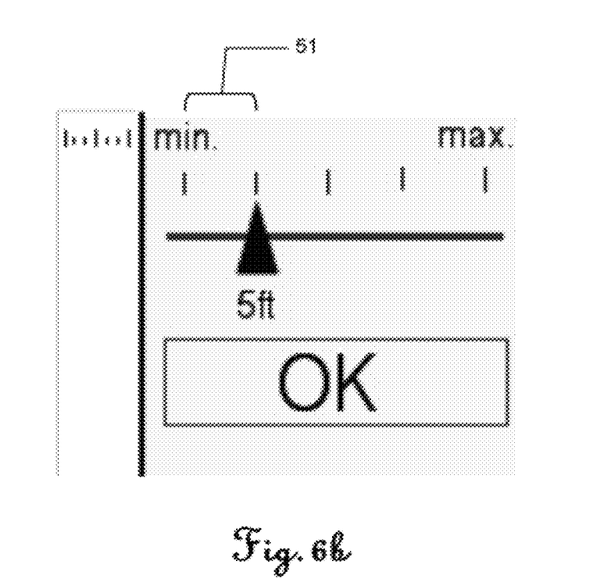
Figure 8:
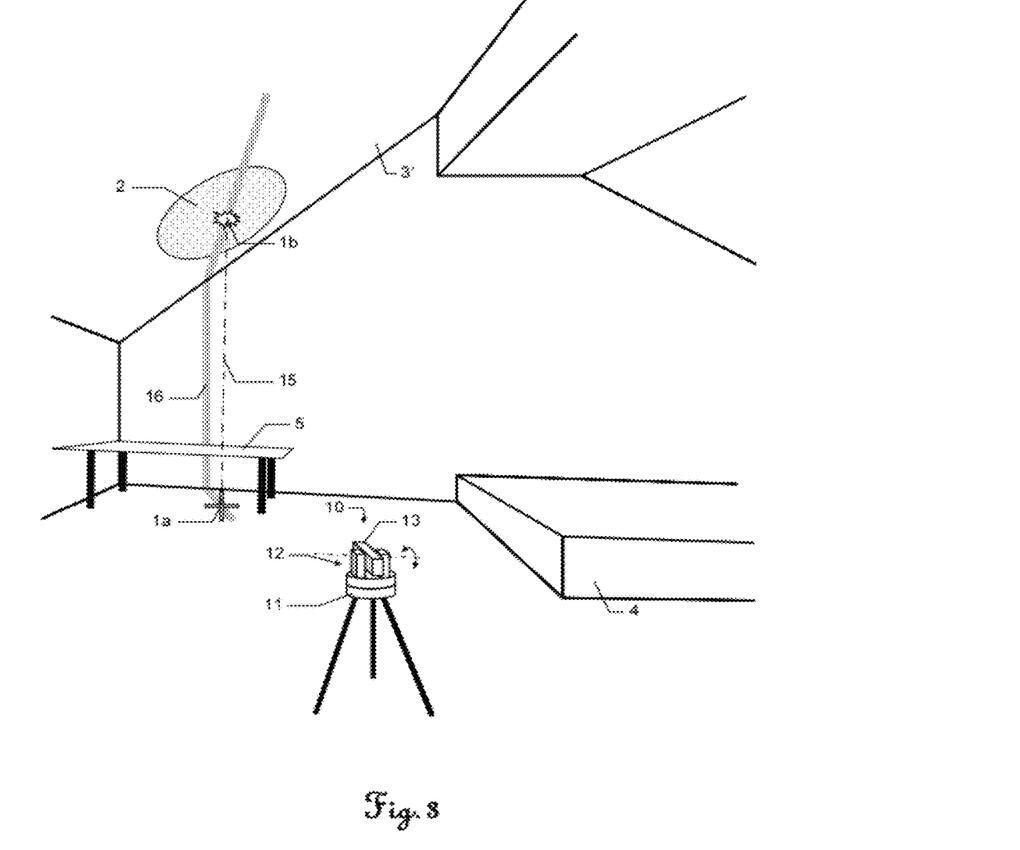

FIGS. 6a and 6b illustrate a further functionality, more precisely a functionality for indicating a threshold value radius 51 around an already measured spatial point 50 for the potential measurement—to be decided by a user—and storage of the coordinates of further spatial points, which is made possible with a further modification of a building surveying device, as described above.

This functionality addresses, for example, the objective if a user wants to connect a line to a spatial point, for example a corner point—already measured beforehand—between wall parts that are angled with respect to one another.

By means of the threshold value radius functionality, a virtual sphere 52 (see FIG. 7a) having a threshold value radius 51 (see FIG. 7b) to be defined by the user is generated and it is indicated to the user whether a spatial point sighted (anew) lies within the threshold value radius 51 of a measurement point that has already been measured beforehand and stored in accordance with its coordinates.

As an alternative to the threshold value sphere, a threshold value radius can also be implemented by the definition (for example by means of measurement) of two further spatial points which are adjacent to a spatial point (in particular corner point) and which define a virtual cylinder containing the spatial point 50, with its longitudinal axis aligned for example parallel or orthogonally with respect to a wall.

The threshold value radius functionality gives the user the alternatives for retaining the measurement values of the old measurement point, replacing them by the measurement values of the new measurement point, or storing the measurement values for both measurement points.

It goes without saying that these figures illustrated merely schematically represent possible exemplary embodiments. The different approaches can likewise be combined with one another and also with methods from the prior art.

We claim:

1. A building surveying device for measuring and marking spatial points during construction and/or development of buildings, comprising:
    a base,
    an upper part supported on the base such that the upper part is rotatable about a rotation axis,
    a sighting unit supported on the upper part such that the sighting unit is pivotable about a pivoting axis and provides distance measuring functionality, with a laser source designed for emitting a laser beam, and a laser light detector, and
    an evaluation and control unit, wherein:
        a first and a second rotary drive enable the upper part and the sighting unit to be driven and aligned;
        a spatial alignment of the sighting unit in relation to the base is acquirable via two goniometers; and
        the evaluation and control unit is connected to the laser source, the laser light detector and the two goniometers in order to assign an acquired distance to a corresponding alignment and thus determine coordinates for spatial points,
        wherein the building surveying device has a plumb point finding functionality which, after being triggered, runs automatically, at least in part, and wherein during the plumb point finding functionality, the spatial alignment of the sighting unit is changed under automatic control by the evaluation and control unit with the aid of the first and/or the second rotary drive, the plumb point finding functionality comprising the steps:
        marking and measuring a first spatial point by the laser beam;
        automatically changing the spatial alignment of the sighting unit based on the measured first spatial point in a manner that a second spatial point is targeted by the laser beam in such a way that the second spatial point lies on an object surface opposite of the first spatial point on a vertical plumb line containing the first spatial point;
        marking the second spatial point by the laser beam; and
        automatically measuring the second spatial point when the second spatial point is reached with the laser beam;
    wherein a reference with respect to a direction perpendicular to a ground surface as an outer perpendicular direction, parallel to the vertical plumb line, is produced by an inclination sensor, wherein the inclination sensor is configured for determining the inclination relative to the Earth's gravitational field vector about two axes and for communicating the measurement data thereof to the evaluation and control unit.

2. A building surveying device according to claim 1, wherein spatial points lying within a tolerance region defined around the vertical plumb line are also deemed to be lying on the vertical plumb line.

3. A building surveying device according to claim 2, wherein the spatial alignment of the sighting unit is changed automatically following a search scheme and spatial points are measured until the second spatial point is reached with the laser beam.

4. A building surveying device according to claim 1, wherein during the plumb point finding functionality, the spatial alignment of the sighting unit is changed automatically iteratively in a manner approaching the second spatial point, and spatial points are measured continuously until the second spatial point is reached with the laser beam.

5. A building surveying device according to claim 1, wherein, during the plumb point finding functionality, the following steps are automatically carried out repeatedly until the second spatial point is reached with the laser beam:
    measuring a currently sighted spatial point;
    determining a mathematical passage point of the vertical plumb line through a horizontal plane containing the currently sighted spatial point; and
    aligning the sighting unit in the direction of the mathematical passage point determined.

6. A building surveying device according to claim 1, wherein with the spatial alignment of the sighting unit with the azimuth angle of the first spatial point, during the plumb point finding functionality an elevative alignment of the sighting unit, is varied, and spatial points are continuously measured until the second spatial point is reached with the laser beam.

7. A building surveying device according to claim 1, wherein, for a case where the sighting unit is situated with an azimuthal alignment deviating from the azimuth angle of the first spatial point, during the plumb point finding functionality, the sighting unit is firstly aligned automatically with the azimuth angle of the first spatial point.

8. A building surveying device according to claim 1, wherein, with an alignment of the laser beam with the object surface, during the plumb point finding functionality, at least three spatial points lying on the object surface are automatically measured or predetermined, a plane spanned by these three spatial points is defined and the point of intersection of said plane with the vertical plumb line is calculated, and said point of intersection is approached and marked by the laser beam as the first spatial point.

9. A building surveying device according to claim 1, wherein with the aid of portions of the laser beam which are reflected at the object surface and are received by the laser light detector, the distance from spatial points of the object surface which are sighted by the laser beam is determined by the evaluation and control unit, wherein the sighting unit is configured such that:

the laser beam emitted by the laser source serves as a measurement and marking laser beam; or the laser source has two partial laser sources, which are designed separately for emitting a first portion of the laser beam as a marking laser beam in the visible wavelength range and respectively a second portion, running coaxially or slightly parallel in an offset fashion with respect to the marking laser beam, of the laser beam as measurement laser beam in the near infrared wavelength range.

10. A building surveying device according to claim 1, wherein the inclination sensor is integrated into the base.

11. A plumb point finding method with a building surveying device for measuring and marking spatial points during construction and/or development of buildings, the building surveying device including:

a base;
an upper part supported on the base such that the upper part is rotatable about a rotation axis;
a sighting unit supported on the upper part such that the sighting unit is pivotable about a pivoting axis and provide distance measuring functionality, with a laser source designed for emitting a laser beam, and a laser light detector; and
an evaluation and control unit, wherein:
a first and a second rotary drive enable the upper part and the sighting unit to be driven and aligned;
a spatial alignment of the sighting unit in relation to the base is acquired via two goniometers; and
the evaluation and control unit is connected to the laser source, the laser light detector and the two goniometers in order to assign an acquired distance to a corresponding alignment and thus determine coordinates for spatial points,
wherein during a plumb point finding method, an alignment of the sighting unit is changed under automatic control by the evaluation and control unit with the aid of the first and/or the second rotary drive, the plumb point finding method comprising the steps:
marking and measuring a first spatial point by the laser beam;
automatically changing the spatial alignment of the sighting unit based on the measured first spatial point in a manner that a second spatial point is targeted by the laser beam in such a way that the second spatial point lies on an object surface opposite to the first spatial point on a vertical plumb line containing the first spatial point;
marking the second spatial point by the laser beam; and
automatically measuring the second spatial point when the second spatial point is reached with the laser beam;
wherein
a reference with respect to a direction perpendicular to a ground surface as an outer perpendicular direction, parallel to the vertical plumb line, is produced by an inclination sensor, wherein the inclination sensor is configured for determining the inclination relative to the Earth's gravitational field vector about two axes and for communicating the measurement data thereof to the evaluation and control unit.

12. A plumb point finding method according to claim 11, wherein spatial points lying within a tolerance region defined around the vertical plumb line are also deemed to be lying on the vertical plumb line.

13. A plumb point finding method according to claim 11, wherein, during the plumb point finding method, the alignment of the sighting unit is changed automatically following a search scheme and spatial points are measured until the second spatial point is reached with the laser beam.

14. A plumb point finding method according to claim 11, wherein, during the plumb point finding method, the alignment of the sighting unit is changed automatically iteratively in a manner approaching the second spatial point and spatial points are measured continuously until the second spatial point is reached with the laser beam.

15. A plumb point finding method according to claim 11, wherein, during the plumb point finding method, the following steps are automatically carried out repeatedly until the second spatial point is reached with the laser beam:
measuring a currently sighted spatial point,
determining a mathematical passage point of the vertical plumb line through a horizontal plane containing the currently sighted spatial point,
and
aligning the sighting unit in the direction of the mathematical passage point determined.

16. A plumb point finding method according to claim 11, wherein, with the alignment of the sighting unit with the azimuth angle of the first spatial point, during the plumb point finding method an elevative alignment of the sighting unit is varied and spatial points are continuously measured until the second spatial point is reached with the laser beam.

17. A plumb point finding method according to claim 11, wherein, for a case where the sighting unit is situated with an azimuthal alignment deviating from the azimuth angle of the first spatial point, during the plumb point finding method the sighting unit is firstly aligned automatically with the azimuth angle of the first spatial point.

18. A plumb point finding method according to claim 11, wherein, with an alignment of the laser beam with the object surface, during the plumb point finding method at least three spatial points lying on the object surface are automatically measured or predetermined, a plane spanned by these three spatial points is defined and the point of intersection of said plane with the vertical plumb line is calculated, and said point of intersection is approached and marked by the laser beam as the first spatial point.

19. A non-transitory computer program product comprising program code, which is stored on a tangible machine-readable carrier, for providing, controlling and carrying out the plumb point finding method according to claim 11, when the program code is executed on an electronic data processing unit.

* * * * *